(12) United States Patent
Li et al.

(10) Patent No.: US 7,565,748 B2
(45) Date of Patent: *Jul. 28, 2009

(54) PORTABLE DIGITAL HORIZONTAL INCLINOMETER

(75) Inventors: Guangjin Li, Guilin (CN); Jian Shi, Guilin (CN)

(73) Assignee: Guilin Gemred Sensor Technology Ltd., Guilin (CN)

( * ) Notice: Subject to any disclaimer, the term of this patent is extended or adjusted under 35 U.S.C. 154(b) by 95 days.

This patent is subject to a terminal disclaimer.

(21) Appl. No.: 11/848,437

(22) Filed: Aug. 31, 2007

(65) Prior Publication Data

US 2007/0289154 A1    Dec. 20, 2007

Related U.S. Application Data

(63) Continuation-in-part of application No. 11/463,599, filed on Aug. 10, 2006, now Pat. No. 7,380,345.

(30) Foreign Application Priority Data

Sep. 3, 2005    (CN) .................. 2005 2 0035400 U

(51) Int. Cl.
G01C 9/12    (2006.01)
G01C 9/06    (2006.01)

(52) U.S. Cl. .................... 33/345; 33/366.24; 33/366.11

(58) Field of Classification Search ............. 33/366.24, 33/344, 345, 366.11, 366.25
See application file for complete search history.

(56) References Cited

U.S. PATENT DOCUMENTS

| 6,137,065 | A  | * | 10/2000 | Zefira ....................... 177/25.13 |
| 6,836,972 | B2 | * | 1/2005  | Drahos et al. ............ 33/366.11 |
| 7,325,327 | B2 | * | 2/2008  | Fischer ....................... 33/706 |
| 7,380,345 | B2 | * | 6/2008  | Li et al. ....................... 33/345 |

* cited by examiner

*Primary Examiner*—Christopher W Fulton
(74) *Attorney, Agent, or Firm*—Matthias Scholl P.C.; Matthias Scholl

(57) ABSTRACT

Taught herein is a portable digital horizontal inclinometer which utilizes magnetic field to dampen the free swing of the pendulum. The inclinometer features simple structure, small size, high sensitivity, good linearity, high precision, and strong anti-jamming capability. It is also easy to manufacture and provide fast and accurate reading over a wide range of inclination angles of up to 360°.

13 Claims, 9 Drawing Sheets

PORTABLE DIGITAL HORIZONTAL INCLINOMETER

CROSS-REFERENCE TO RELATED APPLICATIONS

This is a continuation-in-part application of U.S. application Ser. No. 11/463,599, filed Aug. 10, 2006 now U.S. Pat. No. 7,380,345, granted Jun. 3, 2008, which claims priority to the Chinese Application No. CN 200520035400.2, filed Sep. 3, 2005, the contents of both of which are incorporated herein by reference.

BACKGROUND OF THE INVENTION

1. Field of the Invention

This invention relates to angle measuring instruments, and specifically, to portable digital horizontal inclinometers.

2. Description of the Prior Art

Two types of conventional pendulum inclinometers, one with a damping device and one without, are conventionally used for the measurement of inclination angles. The inclinometer without a damping device is suitable mainly for static measurements as it takes a long time for the stabilization of the pendulum before a correct angle reading can be obtained. The inclinometer with a damping device can provide rapid damping to eliminate the pendulum's free swing, and thus to realize a continuous dynamic measurement to the inclination angle.

Conventionally, silicon oil and air have been used as damping media. However, while the damping coefficient of silicon oil decreases greatly with increasing temperature limiting significantly the operating temperatures of inclinometers utilizing silicon oil, using air for damping is not ideal because it requires complicated designs and high machining precision.

In view of the forgoing, Chinese Pat. App. No. CN00223002.X disclosed a digital inclinometer with magnetic damping, which offers the advantage of stable and fast reading. Unfortunately, the design disclosed therein is not functional for wide angle measurements. Therefore, much opportunity for improvement remains in this area of technology.

SUMMARY OF THE INVENTION

In one embodiment of the invention provided is a portable digital horizontal inclinometer, comprising a housing (1) having a back cover (11) with an outer surface and a plurality of cavities; a roller bearing (2) having a shaft with a tip and a housing, and having a first axis of rotation; a capacitive displacement sensor (3) having a rotatable disk (31) and a grounding finger (32); and a damping device (4) comprising a pendulum (41), a plurality of magnetic slices (42) and a plurality of ferrite beads (43, 44); wherein said rotatable disk (31) and said pendulum (41) are inflexibly attached to said shaft; said grounding finger (32) is disposed on said tip; and at least two said magnetic slices (42) are inserted into said cavities in a way so that the adjacent magnetic slices (42) are oriented with the opposite polarity towards said pendulum (41); at least one said ferrite bead (44) is inflexibly attached to said supporting plate (5); and at least one said ferrite bead (44) parallel to said ferrite bead (43) is bonded on said back cover (11).

In one class of this embodiment, at least one said ferrite bead (43) is inflexibly attached to at least one said magnetic slice (42).

In another class of this embodiment, at least one said ferrite bead (43) is inflexibly attached to said outer surface.

In another class of this embodiment, the magnetic slices (42) provide a uniform magnetic circuit for the pendulum (41), said circuit being symmetric with respect to the first axis of rotation.

In another class of this embodiment, said cavities are about the same size as said magnetic slices (42) so as to allow said magnetic slices (42) to fit snuggly within said cavities.

In another class of this embodiment, said pendulum (41) is rotatable around said axis of rotation in a plane that is parallel to said back cover (11).

In another class of this embodiment, the inclinometer further comprises a supporting plate (5) for supporting said capacitive displacement sensor (3).

In another class of this embodiment, at least one said ferrite bead (44) is inflexibly attached to said supporting plate (5); and the distance of the ferrite bead (43) inflexibly attached to said supporting plate (5) from said first axis of rotation is about the same as the distance of the ferrite bead (43) inflexibly attached to said outer surface from said first axis of rotation.

In another class of this embodiment, the inclinometer further comprises a plurality of magnets (6) disposed at the bottom of the housing (1); a power button (7) disposed in front of the housing (1) and operating to switch on or off the inclinometer; a reset button (8) disposed in front of the housing (1) and operating to resetting the inclinometer; a display device (9) disposed in front of the housing (1) and operating to display a result of the inclinometer; and a display circuit board (10) operating to transforming a signal output from the capacitive displacement sensor (3) and outputting the transformed signal to the display device (9).

In another embodiment of the invention provided is a portable digital horizontal inclinometer, comprising a housing (1) having a back cover (11) with an outer surface and a plurality of cavities; a roller bearing (2) having a shaft with a tip and a housing, and having a first axis of rotation; a capacitive displacement sensor (3) having a rotatable disk (31) and a grounding finger (32); a damping device (4) comprising a pendulum (41) and a plurality of magnetic slices (42) and a plurality of ferrite beads (43); and a level bubble (13) disposed at the top of said housing (1); wherein said rotatable disk (31) and said pendulum (41) are inflexibly attached to said shaft; said grounding finger (32) is disposed on said tip; at least two said magnetic slices (42) are inserted into said cavities in a way so that the adjacent magnetic slices (42) are oriented with the opposite polarity towards said pendulum (41); and said level bubble (13) operates to measure an angle of the portable digital horizontal inclinometer with respect to the ground.

In one class of this embodiment, the inclinometer further comprises a supporting plate (5) for supporting said capacitive displacement sensor (3).

In another class of this embodiment, at least one said ferrite bead (44) is inflexibly attached to said supporting plate (5); and the distance of the ferrite bead (43) inflexibly attached to said supporting plate (2) from said first axis of rotation is about the same as the distance of the ferrite bead (8) inflexibly attached to said outer surface from said first axis of rotation.

In another class of this embodiment, at least one said ferrite bead (43) is inflexibly attached to at least one said magnetic slice (42).

In another class of this embodiment, at least one said ferrite bead (43) is inflexibly attached to said outer surface.

In another class of this embodiment, the magnetic slices (42) provide a uniform magnetic circuit for the pendulum (41), said circuit being symmetric with respect to the first axis of rotation.

In another class of this embodiment, said cavities are about the same size as said magnetic slices (42) so as to allow said magnetic slices (42) to fit snuggly within said cavities.

In another class of this embodiment, said pendulum (41) is rotatable around said axis of rotation in a plane that is parallel to said supporting plate (5).

In one class of this embodiment, the inclinometer further comprises a plurality of magnets (6) disposed at the bottom of the housing (1); a power button (7) disposed in front of the housing (1) and operating to switch on or off the inclinometer; a reset button (8) disposed in front of the housing (1) and operating to resetting the inclinometer; a display device (9) disposed in front of the housing (1) and operating to display a result of the inclinometer; and a display circuit board (10) operating to transforming a signal output from the capacitive displacement sensor (3) and outputting the transformed signal to the display device (9).

In a further embodiment of the invention provided is a portable digital horizontal inclinometer with an angle measuring portion and a displaying portion, the angle measuring portion comprising a first housing (1) having a back cover (11) with an outer surface and a plurality of cavities; a roller bearing (2) having a shaft with a tip and a housing, and having a first axis of rotation; a capacitive displacement sensor (3) having a rotatable disk (31) and a grounding finger (32); and a damping device (4) comprising a pendulum (41) and a plurality of magnetic slices (42) and a plurality of ferrite beads (43); and said displaying portion comprising a second housing (14) connecting to said first housing (1) via a cable (15); and a display circuit board (10) disposed inside said second housing (14) and operating to display a result of the inclinometer; wherein said rotatable disk (31) and said pendulum (41) are inflexibly attached to said shaft; said grounding finger (32) is disposed on said tip; at least two said magnetic slices (42) are inserted into said cavities in a way so that the adjacent magnetic slices (42) are oriented with the opposite polarity towards said pendulum (41); and the cable operates to transmits output signals from said capacitive displacement sensor (3) to said display circuit board (10).

In one class of this embodiment, the inclinometer further comprises a plurality of magnets (6) disposed at the bottom of the first housing (1); a power button (7) disposed in front of the second housing (14) and operating to switch on or off the inclinometer; and a reset button (8) disposed in front of the second housing (14) and operating to resetting the inclinometer; a display device (9) disposed in front of the second housing (14) and operating to display a result of said inclinometer.

BRIEF DESCRIPTION OF THE DRAWINGS

Many of the attendant advantages of the invention will become more readily apparent and better understood as the following detailed description is considered in connection with the accompanying drawings in which.

DETAILED DESCRIPTION OF THE INVENTION

Figure 1:
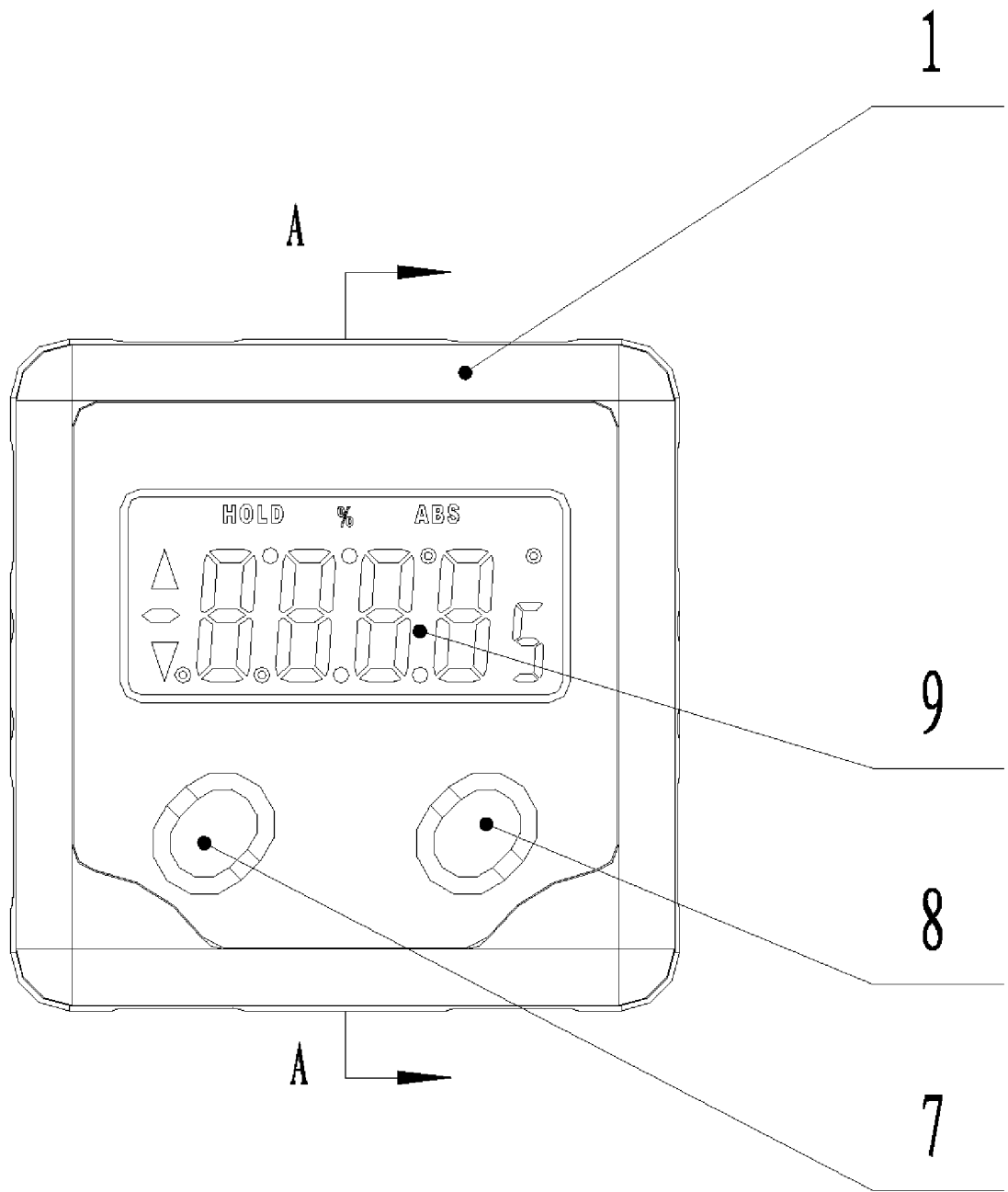
FIG. 1 is a front elevational view of a portable digital horizontal inclinometer of a first embodiment of the invention.

One objective of the invention is to provide a portable digital horizontal inclinometer having not only simple structure, small size, good linearity, high precision, and strong anti-jamming capability, but also effective damping to the pendulum so as to realize fast and accurate angle reading over a wide range of inclination angles.

In accordance with the invention, portable digital horizontal inclinometers are disclosed. The inclinometer having an angle measuring device comprises a housing, a supporting plate, a capacitive displacement sensor, a pendulum, a shaft, a back cover, and a damping device. The damping device comprises a damping slice and at least one magnetic slice. The rotatable disk of capacitive displacement sensor and the pendulum are inflexibly attached to and interlocked with the shaft of the rolling bearing system. The grounding finger of the capacitive displacement sensor is settled on the pointed end of the shaft of the rolling bearing system. The cavities matching with the magnetic slices are arranged on the circular plane of the back cover paralleling with the plane of swing of the pendulum. A plurality of ferrite beads are bonded on the outer surface of the back cover. At least two magnetic slices are inserted into the matching holes of the cover, with the alignment of opposite polarity for the adjacent slices. One side of the magnet slice is bonded with the ferrite bead, and the other forms an air magnetic circuit with other magnetic slices. The damping slice, that is the pendulum, always operates within the magnetic air gap provided by the magnetic slices.

In order to decrease the leakage and increase the intensity of magnetic field of the magnetic gap, a ferrite bead is bonded on the surface of the supporting plate opposite the pendulum and the magnet slice, and corresponds to the ferrite bead bonded on the back cover.

The magnetic slices can also be arranged circularly on the surface of the supporting plate with the adjacent slices being aligned with opposite polarity. One side of the magnetic slice is bonded with the ferrite bead, and the other forms magnetic field with the other magnetic slices.

In one embodiment of the invention, during measurement when the housing is inclined, the pendulum swings under the influence of gravity, which then drives the rotatable disk of the capacitive displacement sensor to rotate and to produce a digital signal of a magnitude corresponding to the swing angle. The value of the angle is obtained when the digital signal is processed by an integrated circuit.

While the pendulum transverses the magnetic field lines, a Foucault current is generated which produces resistance that opposes the motion of the pendulum. The amount of the Foucault current is directly proportional to the speed of swing with the amount of resistance decreasing with a decrease in speed. Therefore, the ultimate position of the pendulum is free from the influence of resistance, but due to the existence of resistance during the swing, the pendulum can be stabilized quickly, and in this way a fast reading is realized.

In certain embodiments of the invention, a capacitive displacement sensor is used for the measurement of the inclination angle. A capacitive displacement sensor has the characteristics of low power consumption, high sensitivity, and easy processing of the digital signal output.

The uniform arrangement of permanent magnetic steels (magnetic slices) on the circle of the back cover causes the fan pendulum to always stay in the magnetic air gap over the range of 360°. The magnetic slices provide a uniform magnetic circuit for the pendulum, said circuit being symmetric with respect to the axis of rotation. This allows for a continuous measurement of the inclination angle over the range of 360°. In addition, the location of the grounding finger offers more stable and sensitive operation of the capacitive displacement sensor.

The portable digital horizontal inclinometer disclosed herein provides the advantages of small size, wide angle measurement range up to 360°, good linearity, high precision, fine damping, fast and stable reading, strong anti-jamming capability, and a large range of operating temperatures. The inclinometer in accordance with the invention is especially suitable for applications where portability is required.

With reference to FIGS. 1-4, the inclinometer in accordance with the invention comprises a housing 1, a roller bearing 2, a capacitive displacement sensor 3, a damping device 4, a supporting plate 5, a plurality of magnets 6, a power button 7, a reset button 8, a display device 9, a display circuit board 10 and a battery cover 12.

The housing 1 comprises a back cover 14, an outer surface, and a plurality of cavities.

The roller bearing 2 comprises a shaft with a tip and a bearing housing. The roller bearing 2 has a first axis of rotation.

The capacitive displacement sensor 3 comprises a rotatable disk 31 and a grounding finger 32. The rotatable disk 31 is inflexibly attached to the shaft of the roller bearing 2, and the grounding finger 32 is disposed on the tip of the shaft. The grounding finger 32 is settled on the pointed end of the shaft of the roller bearing 2. This results in a more stable and effective grounding of the rotatable disk 31 of the capacitive displacement sensor 3.

The damping device 4 comprises a pendulum 41, a plurality of magnetic slices 42, and a plurality of ferrite beads 43. The pendulum 41 is inflexibly attached to the shaft of the roller bearing 2, and at least two of the magnetic slices 42 are inserted into the cavities of the housing 1 in a way so that the adjacent magnetic slices 42 are oriented with the opposite polarity towards the pendulum 41. The rotatable disk 31 and the pendulum 41 are disposed in the two cavities formed in the housing 1 at both ends of the roller bearing 2, respectively, and are interlocked with the shaft.

In one embodiment, the pendulum 41 is a fan pendulum, and is made of a non-magnetic metal material, the magnetic slices 42 are made of permanent magnetic material, and the ferrite beads 43 are made of magnetic metal material.

In certain embodiments of the invention, the ferrite bead 43 is bonded with the back cover 11. In certain embodiments on the invention, at least two thin (coin-like shaped) permanent magnetic steel slices 42 are arranged circularly on the surface opposing to the fan pendulum 41, adjacent permanent magnetic steel slices 42 facing up with the opposite polarity.

In certain embodiments of the invention, one side of the slice 42 is bonded with the ferrite bead 43, and the other side forms a magnetic air gap with another slice 42. The fan pendulum 41 is disposed at all times within the magnetic air gap and is engulfed by the magnetic field lines.

The supporting plate 5 is inflexibly attached to the housing 1, and supports the capacitive displacement sensor 3. The roller bearing 2 is disposed in the center cavity of the supporting plate 5.

In order to decrease the magnetic field leakage and increase the intensity of the magnetic field of the magnetic air gap, a ferrite bead 43 is bonded on the surface of the supporting plate 5 opposite to the pendulum 41 and the magnetic slice 42, and another ferrite bead 44 parallel to the ferrite bead 43 is bonded on the back cover 11.

The plurality of magnets 6 is disposed in the bottom portion of the housing 1, so as to be contacted with an object the inclination angle of which is to be measured.

The power button 7 switches on and off the inclinometer.

The reset button 8 resets the inclinometer before a new measurement is to be taken.

The display device 9 displays an angle measured by the inclinometer.

The display circuit board 10 transforms the signal generated by the capacitive displacement sensor 3 and outputs the transformed signal to the display device 9.

The battery cover 12 shields the battery and allows for an easy insertion and removal of the battery from the device.

Figure 5:
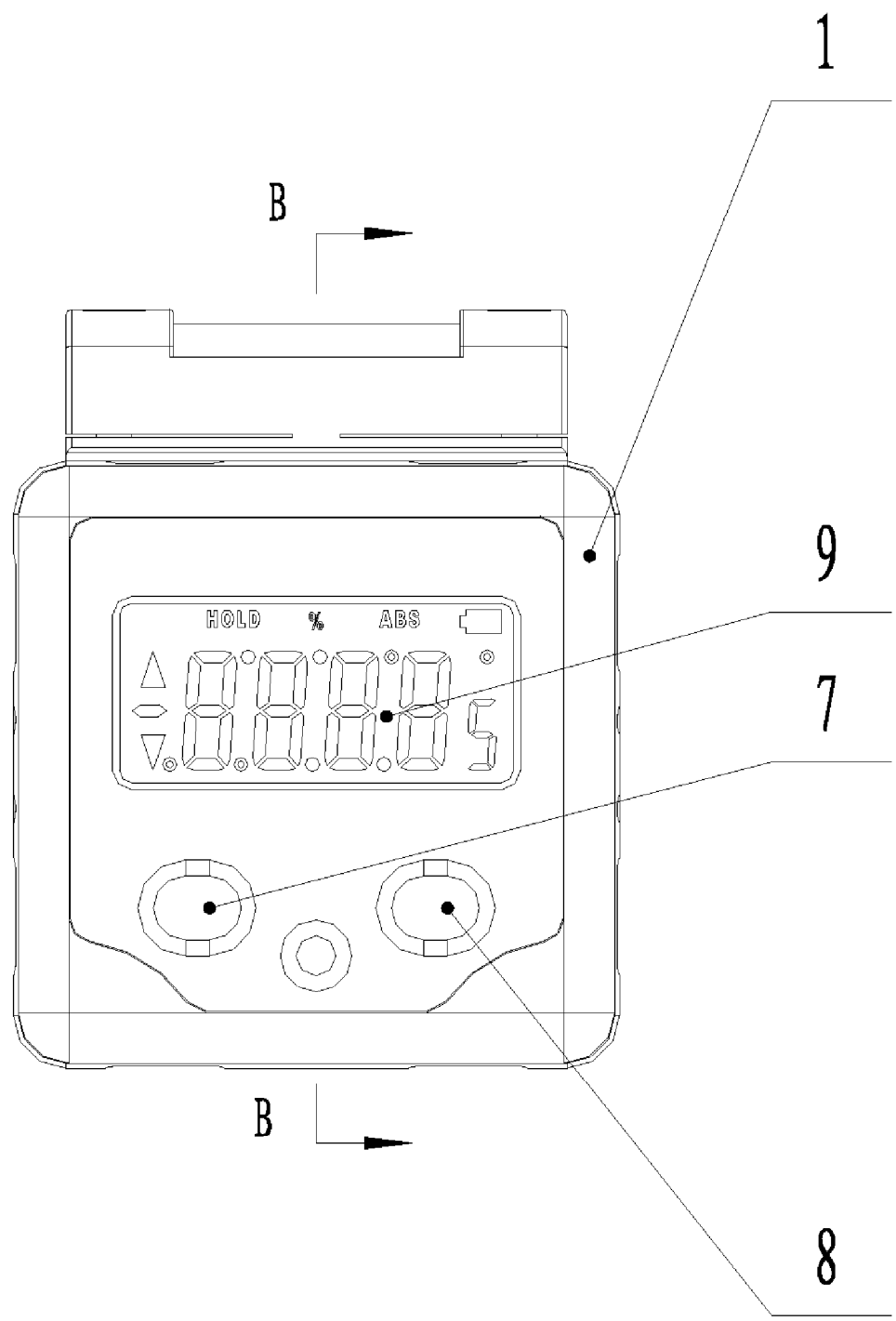
FIG. 5 is a front elevational view of a portable digital horizontal inclinometer of a second embodiment of the invention.
Figure 6:
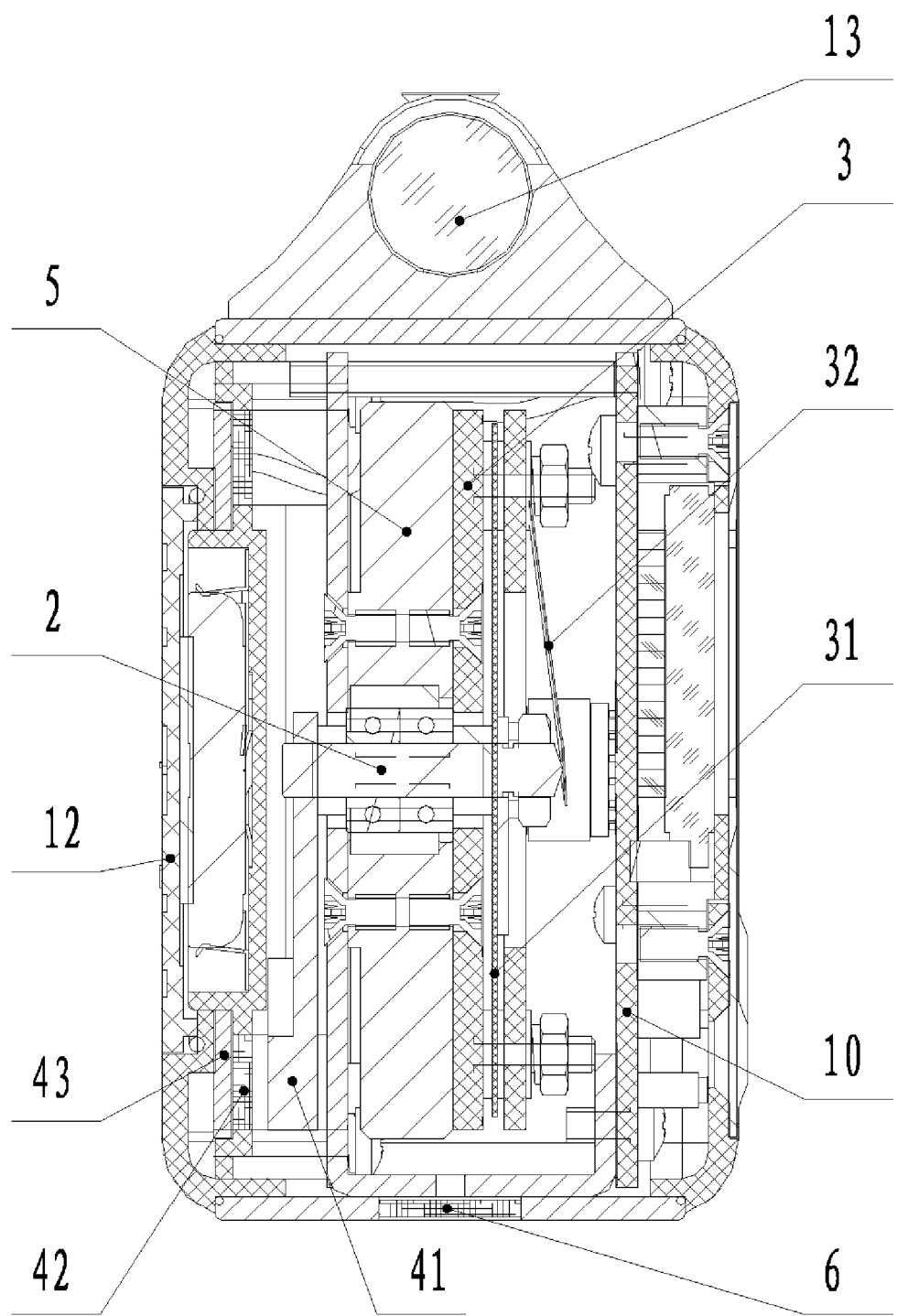
FIG. 6 is a cross-sectional view thereof along the B-B line shown in FIG. 5.
Figure 7:
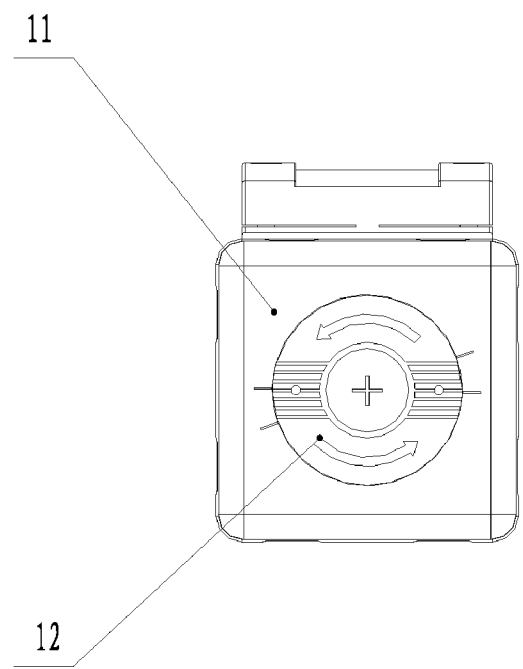
FIG. 7 is a back elevational view of a portable digital horizontal inclinometer of a second embodiment of the invention.
Figure 8:
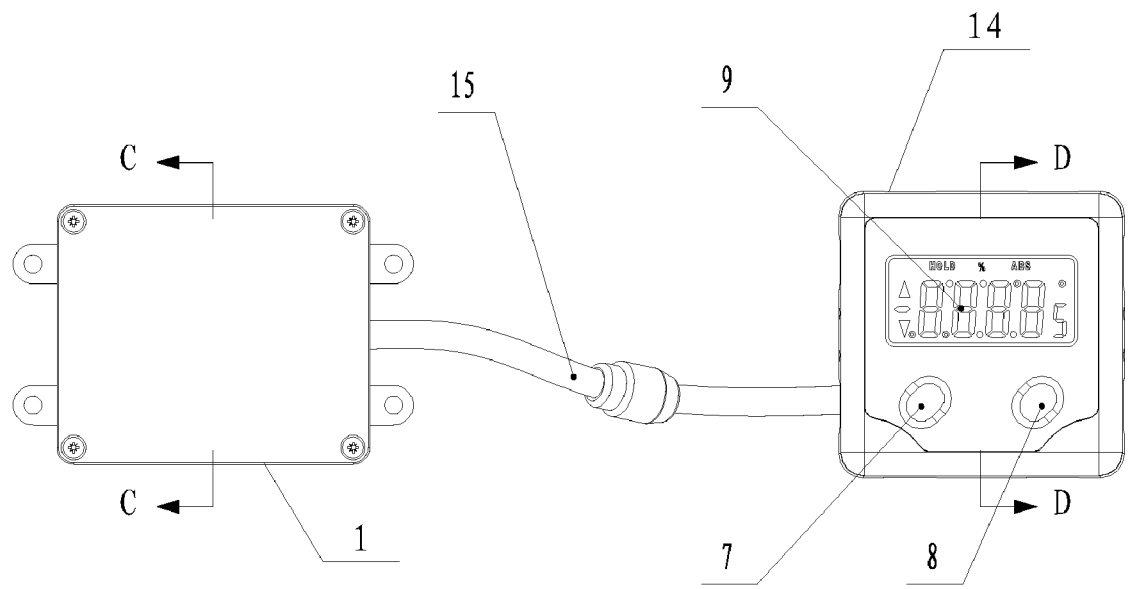
FIG. 8 is a front view of a portable digital horizontal inclinometer of a third embodiment of the invention.
Figure 9:
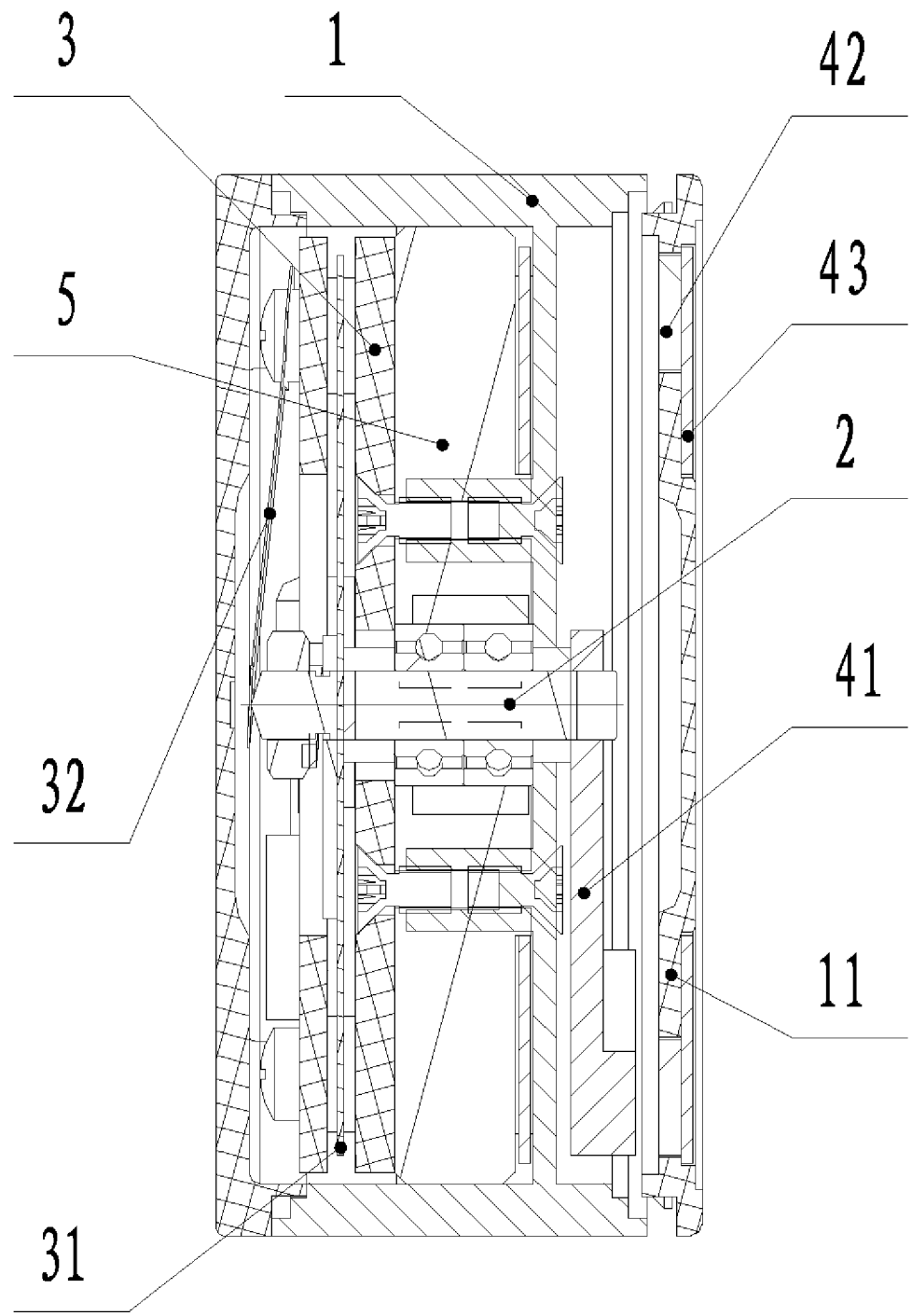
FIG. 9 is a cross-sectional view of a portable digital horizontal inclinometer along the C-C line shown in FIG. 8.
Figure 10:
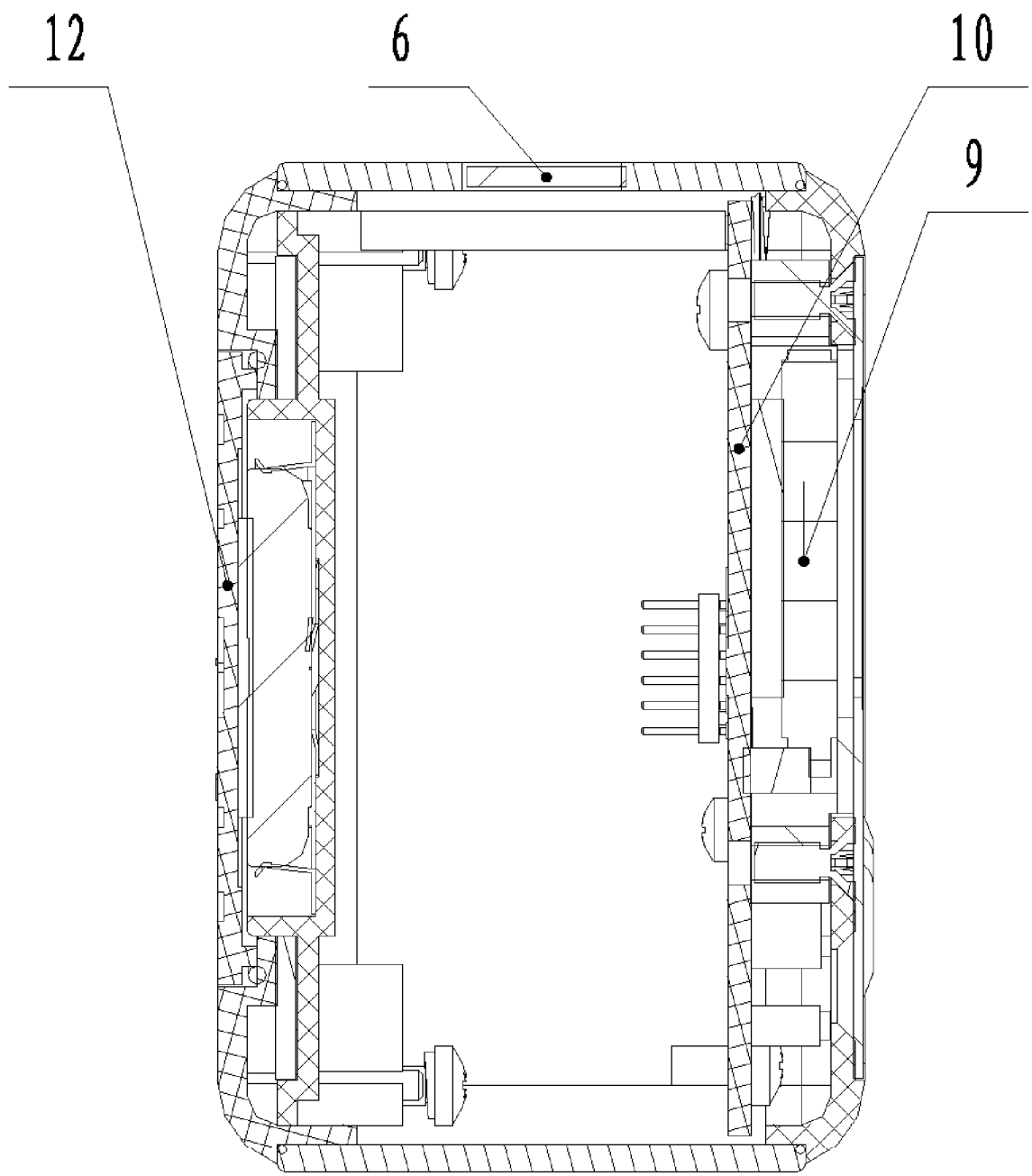
FIG. 10 is a cross-sectional view of a portable digital horizontal inclinometer along the D-D line shown in FIG. 8.
Figure 11:
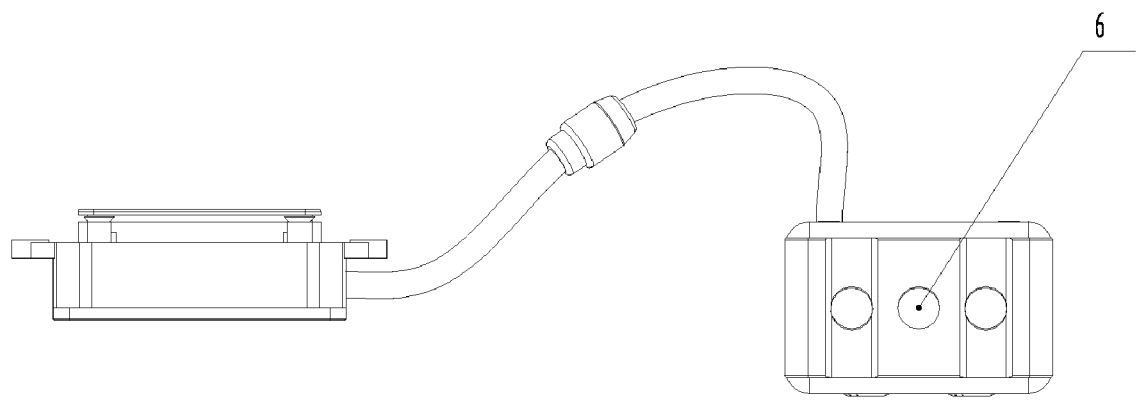
FIG. 11 is a top plan view of a portable digital horizontal inclinometer of a third embodiment of the invention.

With reference to FIGS. 5-7, the inclinometer in accordance with a second embodiment of the invention comprises a housing 1, a roller bearing 2, a capacitive displacement sensor 3, a damping device 4, a supporting plate 5, a plurality of magnets 6, a power button 7, a reset button 8, a display device 9, a display circuit board 10, a battery cover 12 and a level bubble 13.

Figure 2:
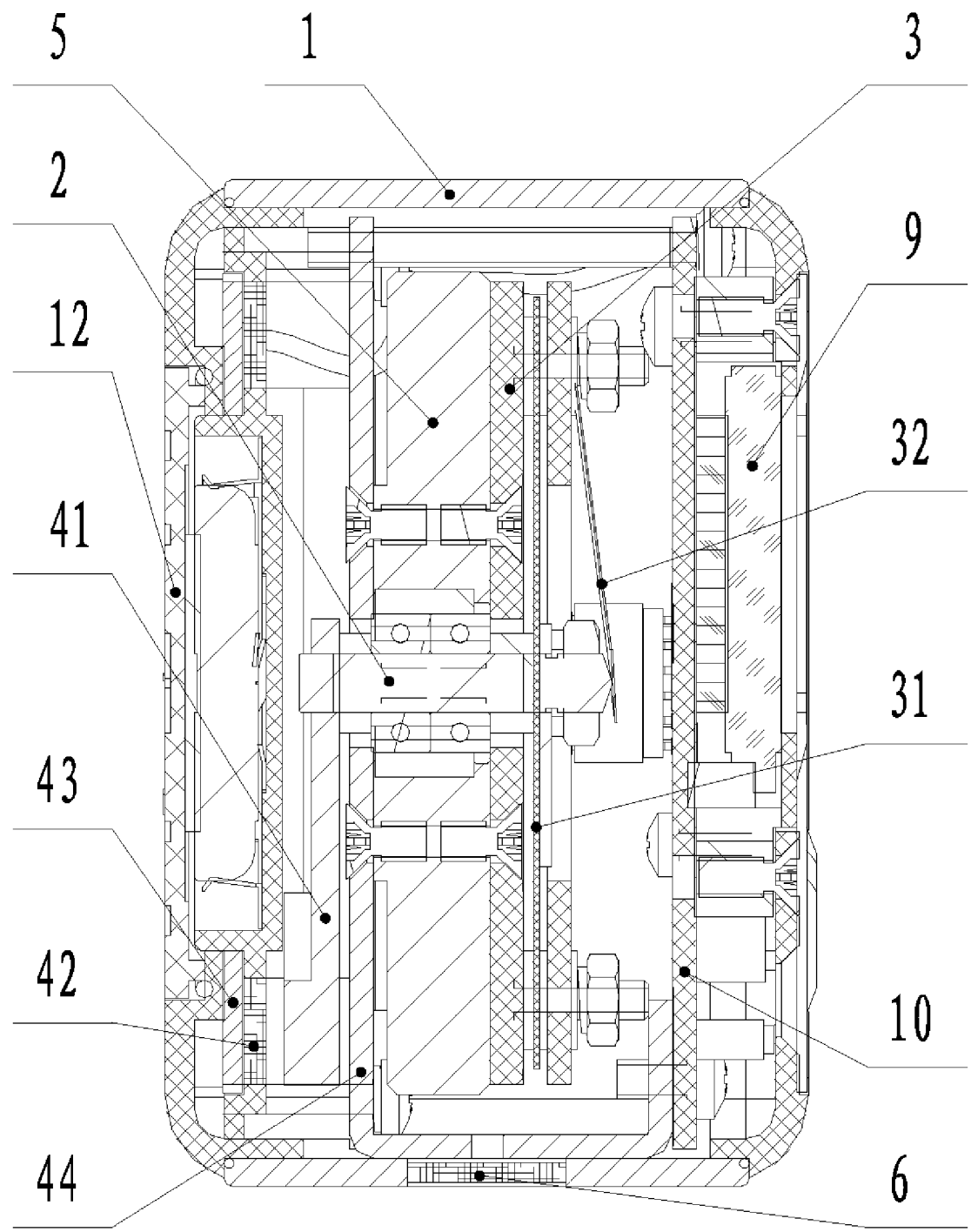
FIG. 2 is a side cross-sectional view thereof along the A-A line shown in FIG. 1.
Figure 3:
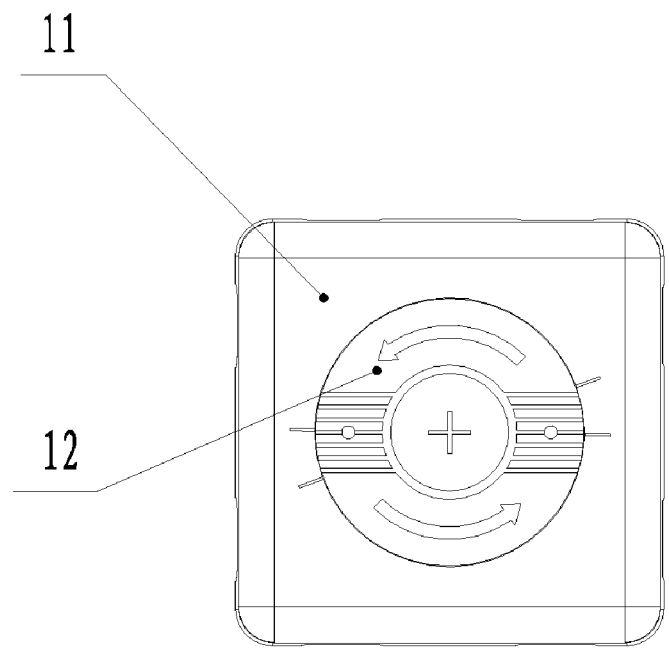
FIG. 3 is a back elevational view of a portable digital horizontal inclinometer of a first embodiment of the invention.
Figure 4:
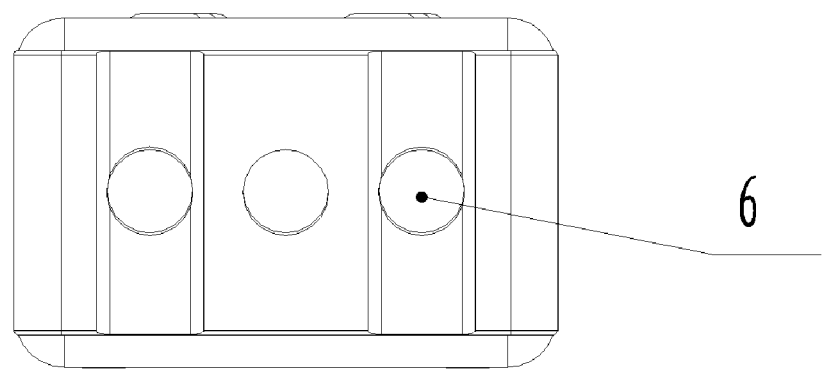
FIG. 4 is a top plan view thereof.

The housing 1, the roller bearing 2, the capacitive displacement sensor 3, the damping device 4, the supporting plate 5, the magnets 6, the power button 7, the reset button 8, the display device 9, the display circuit board 10 and the battery cover 12 are the same as those referred above with reference to FIGS. 1 and 2. The level bubble 13 measures and displays the inclination angle of the portable digital horizontal inclinometer with respect to the horizontal. In certain embodiments, the level bubble 13 employed is of high accuracy and sensitivity, the accuracy being from about 2 to about 10 times greater than that of the display device 9.

With reference to FIGS. 8-11, the inclinometer in accordance with the invention comprises an angle measurement portion and a display portion. The angle measurement portion comprises a first housing 1, a roller bearing 2, a capacitive displacement sensor 3, a damping device 4, a supporting plate 5, and a plurality of magnets 6. The display portion comprises a second housing 14, a power button 7, a reset button 8, a display device 9, a display circuit board 10 and a battery cover 12.

The housing 1, the roller bearing 2, the capacitive displacement sensor 3, the damping device 4, the supporting plate 5, the magnets 6, the power button 7, the reset button 8, the display device 9, the display circuit board 10 and the battery cover 12 are the same as those referred above with reference to FIGS. 1 and 2.

The second housing 14 is connected to the first housing 1 via a cable 15. In other embodiments, connection between the first housing 1 and the second housing 14 may be implemented by disposing a transmitting module in the first housing 1, and a receiving module in the second housing 14, the display circuit board 9 being capable of wirelessly receiving a signal from the capacitive displacement sensor 3 via the receiving module, and thus the first housing 1 may be disposed in a certain distance away from the second housing 14.

The sensor according to the invention has the features of small staring torque and rotational resistance, and high angle resolution. For applications requiring high damping, the length, the mass, and the air gap flux of the pendulum, as well as its material property and thickness can be optimized according to the characteristic of angle variation of the inclination.

This invention is not to be limited to the specific embodiments disclosed herein and modifications for various applications and other embodiments are intended to be included within the scope of the appended claims. While this invention has been described in connection with particular examples thereof, the true scope of the invention should not be so limited since other modifications will become apparent to the skilled practitioner upon a study of the drawings, specification, and following claims.

All publications and patent applications mentioned in this specification are indicative of the level of skill of those skilled in the art to which this invention pertains, and are incorporated herein by reference to the same extent as if each individual publication or patent application mentioned in this specification was specifically and individually indicated to be incorporated by reference.

What is claimed is:

1. A portable digital horizontal inclinometer, comprising
   a housing (1) having a back cover (11) with an outer surface and a plurality of cavities;
   a roller bearing (2) having a shaft with a tip and a housing, and having a first axis of rotation;
   a capacitive displacement sensor (3) having a rotatable disk (31) and a grounding finger (32);
   a supporting plate (5) for supporting said capacitive displacement sensor (3); and
   a damping device (4) comprising a pendulum (41), a plurality of magnetic slices (42) and a plurality of ferrite beads (43, 44);
   wherein
   said rotatable disk (31) and said pendulum (41) are inflexibly attached to said shaft;
   said grounding finger (32) is disposed on said tip;
   at least two said magnetic slices (42) are inserted into said cavities in a way so that two adjacent magnetic slices (42) are oriented with the opposite polarity towards said pendulum (41);
   at least one said ferrite bead (44) is inflexibly attached to said supporting plate (5); and
   at least one said ferrite bead (44) parallel to said ferrite bead (43) is bonded on said back cover (11).

2. The inclinometer of claim 1, further comprising
   a plurality of magnets (6) disposed at the bottom of the housing (1);
   a power button (7) disposed in front of the housing (1) and operating to switch on or off the inclinometer;
   a reset button (8) disposed in front of the housing (1) and operating to resetting the inclinometer;
   a display device (9) disposed in front of the housing (1) and operating to display a result of the inclinometer; and
   a display circuit board (10) operating to transforming a signal output from the capacitive displacement sensor (3) and outputting the transformed signal to the display device (9).

3. A portable digital horizontal inclinometer, comprising
   a housing (1) having a back cover (11) with an outer surface and a plurality of cavities;
   a roller bearing (2) having a shaft with a tip and a housing, and having a first axis of rotation;
   a capacitive displacement sensor (3) having a rotatable disk (31) and a grounding finger (32);
   a damping device (4) comprising a pendulum (41) and a plurality of magnetic slices (42) and a plurality of ferrite beads (43); and
   a level bubble (13) attached to said housing (1);
   wherein
   said rotatable disk (31) and said pendulum (41) are inflexibly attached to said shaft;
   said grounding finger (32) is disposed on said tip;
   at least two said magnetic slices (42) are inserted into said cavities in a way so that the adjacent magnetic slices (42) are oriented with the opposite polarity towards said pendulum (41); and
   said level bubble (13) operates to measure an angle of the portable digital horizontal inclinometer with respect to the ground.

4. The inclinometer of claim 3, further comprising a supporting plate (5) for supporting said capacitive displacement sensor (3).

5. The inclinometer of claim 4, wherein
   at least one said ferrite bead (44) is inflexibly attached to said supporting plate (5); and
   the distance of the ferrite bead (43) inflexibly attached to said supporting plate (2) from said first axis of rotation is about the same as the distance of the ferrite bead (8) inflexibly attached to said outer surface from said first axis of rotation.

6. The inclinometer of claim 5, wherein at least one said ferrite bead (43) is inflexibly attached to at least one said magnetic slice (42).

7. The inclinometer of claim 6, wherein at least one said ferrite bead (43) is inflexibly attached to said outer surface.

8. The inclinometer of claim 7, wherein the magnetic slices (42) provide a uniform magnetic circuit for the pendulum (41), said circuit being symmetric with respect to the first axis of rotation.

9. The inclinometer of claim 7, wherein said cavities are about the same size as said magnetic slices (42) so as to allow said magnetic slices (42) to fit snuggly within said cavities.

10. The inclinometer of claim 7, wherein said pendulum (41) is rotatable around said axis of rotation in a plane that is parallel to said supporting plate (5).

11. The inclinometer of claim 3, further comprising
    a plurality of magnets (6) disposed at the bottom of the housing (1);
    a power button (7) disposed in front of the housing (1) and operating to switch on or off the inclinometer;
    a reset button (8) disposed in front of the housing (1) and operating to resetting the inclinometer;
    a display device (9) disposed in front of the housing (1) and operating to display a result of the inclinometer; and
    a display circuit board (10) operating to transforming a signal output from the capacitive displacement sensor (3) and outputting the transformed signal to the display device (9).

12. A portable digital horizontal inclinometer with an angle measuring portion and a displaying portion,
    wherein
    the angle measuring portion comprises:
    (a) a first housing (1) having a back cover (11) with an outer surface and a plurality of cavities;

(b) a roller bearing (2) having a shaft with a tip and a housing, and having a first axis of rotation;

(c) a capacitive displacement sensor (3) having a rotatable disk (31) and a grounding finger (32); and (d) a damping device (4) comprising a pendulum (41) and a plurality of magnetic slices (42) and one or more ferrite beads (43);

the displaying portion comprises (a) a second housing (14) connecting to said first housing (1) via a cable (15); and (b) a display circuit board (10) disposed inside said second housing (14) and operating to display a result of the inclinometer;

said rotatable disk (31) and said pendulum (41) are inflexibly attached to said shaft;

said grounding finger (32) is disposed on said tip;

at least two said magnetic slices (42) are inserted into said cavities in a way so that the adjacent magnetic slices (42) are oriented with the opposite polarity towards said pendulum (41); and the cable operates to transmits output signals from said capacitive displacement sensor (3) to said display circuit board (10).

13. The inclinometer of claim 12, further comprising a plurality of magnets (6) disposed at the bottom of the first housing (1);

a power button (7) disposed in front of the second housing (14) and operating to switch on or off the inclinometer;

a reset button (8) disposed in front of the second housing (14) and operating to resetting the inclinometer; and a display device (9) disposed in front of the second housing (14) and operating to display a result of said inclinometer.

\* \* \* \* \*